(12) United States Patent
Matusevich

(10) Patent No.: US 6,560,210 B1
(45) Date of Patent: May 6, 2003

(54) HANDING OFF A WIRELESS TERMINAL IN A WIRELESS TELECOMMUNICATIONS SYSTEM

(75) Inventor: Alex Matusevich, Morris Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/095,235

(22) Filed: Jun. 10, 1998

(51) Int. Cl.[7] .................................................. H04Q 7/00
(52) U.S. Cl. ........................ 370/331; 370/335; 370/337; 455/436
(58) Field of Search ................................ 370/328, 329, 370/330, 331, 332, 333, 334, 335, 336, 337, 342, 343, 344, 345; 455/436, 437, 438, 439, 440, 441, 442, 443, 444

(56) References Cited

U.S. PATENT DOCUMENTS

| 5,101,501 A | * | 3/1992 | Gilhousen et al. | 455/442 |
|---|---|---|---|---|
| 5,594,718 A | * | 1/1997 | Weaver, Jr. et al. | 370/331 |
| 5,883,888 A | * | 3/1999 | St-Pierre | 370/331 |
| 5,884,173 A | * | 3/1999 | Sollner | 455/436 |
| 5,917,811 A | * | 6/1999 | Weaver, Jr. et al. | 370/332 |
| 5,926,470 A | * | 7/1999 | Tiedemann, Jr. | 370/334 |
| 5,937,019 A | * | 8/1999 | Padovani | 375/358 |

* cited by examiner

Primary Examiner—Douglas Olms
Assistant Examiner—Bob A. Phunkulh
(74) Attorney, Agent, or Firm—DeMont & Breyer, LLC

(57) ABSTRACT

A wireless telecommunications system is disclosed that hands off a wireless terminal from one base station to another as the wireless terminal moves within a wireless telecommunications system. Each pair of communications channels (forward and reverse) that are used by the system for communication with a specific wireless terminal are not associated with a specific base station. Instead, the pair of communications channels are associated with the wireless terminal and are used by the wireless terminal both before and after a hand off. Before the hand off, the wireless terminal uses the pair of communications channels for communicating with a first base station. To accomplish the hand off to a second base station, the first base station stops using the communications channels at the same time that the second base station starts using them. Although the wireless terminal is handed off from the first base station to the second base station, re-tuning of the wireless terminal is not required.

32 Claims, 9 Drawing Sheets

100

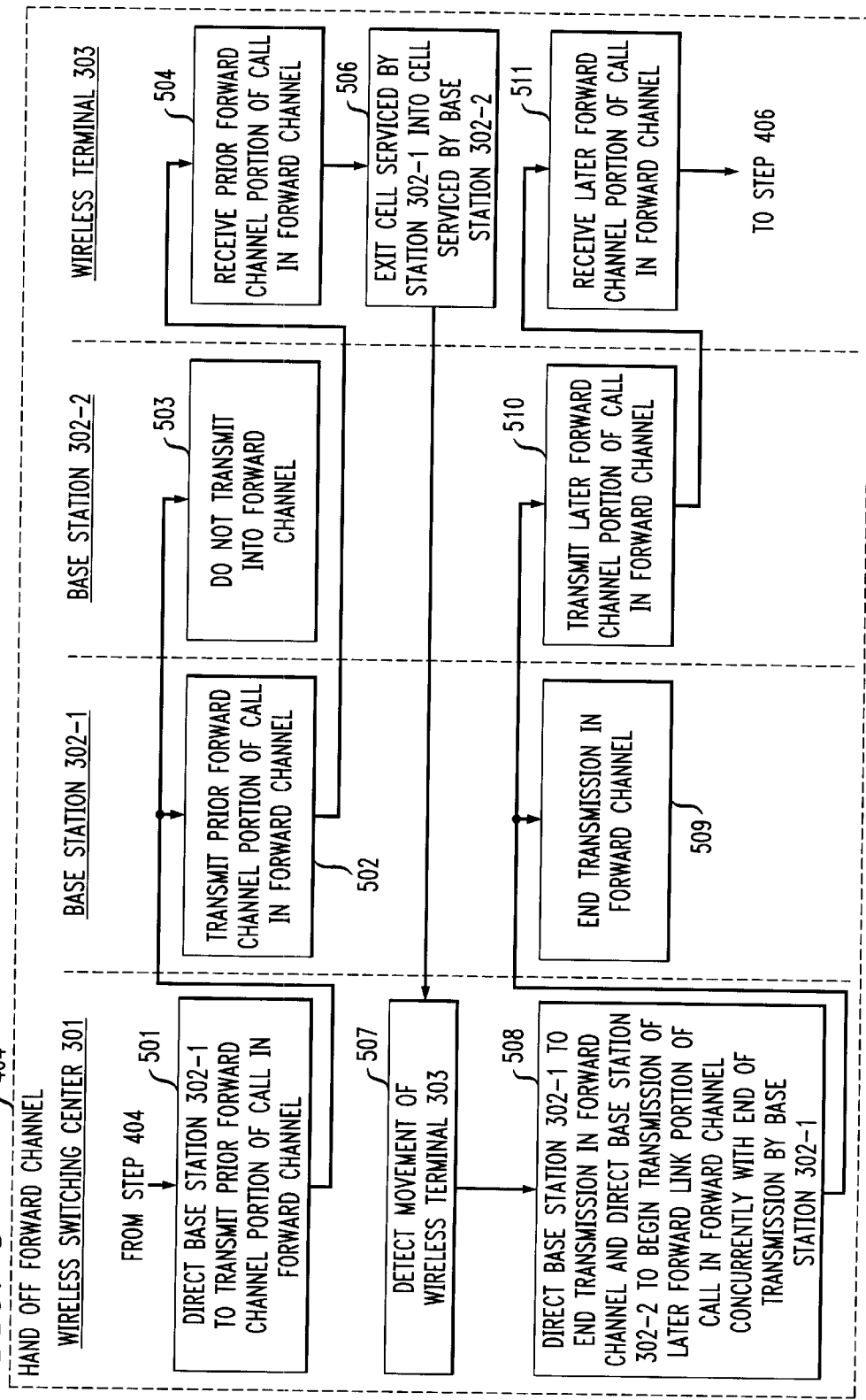

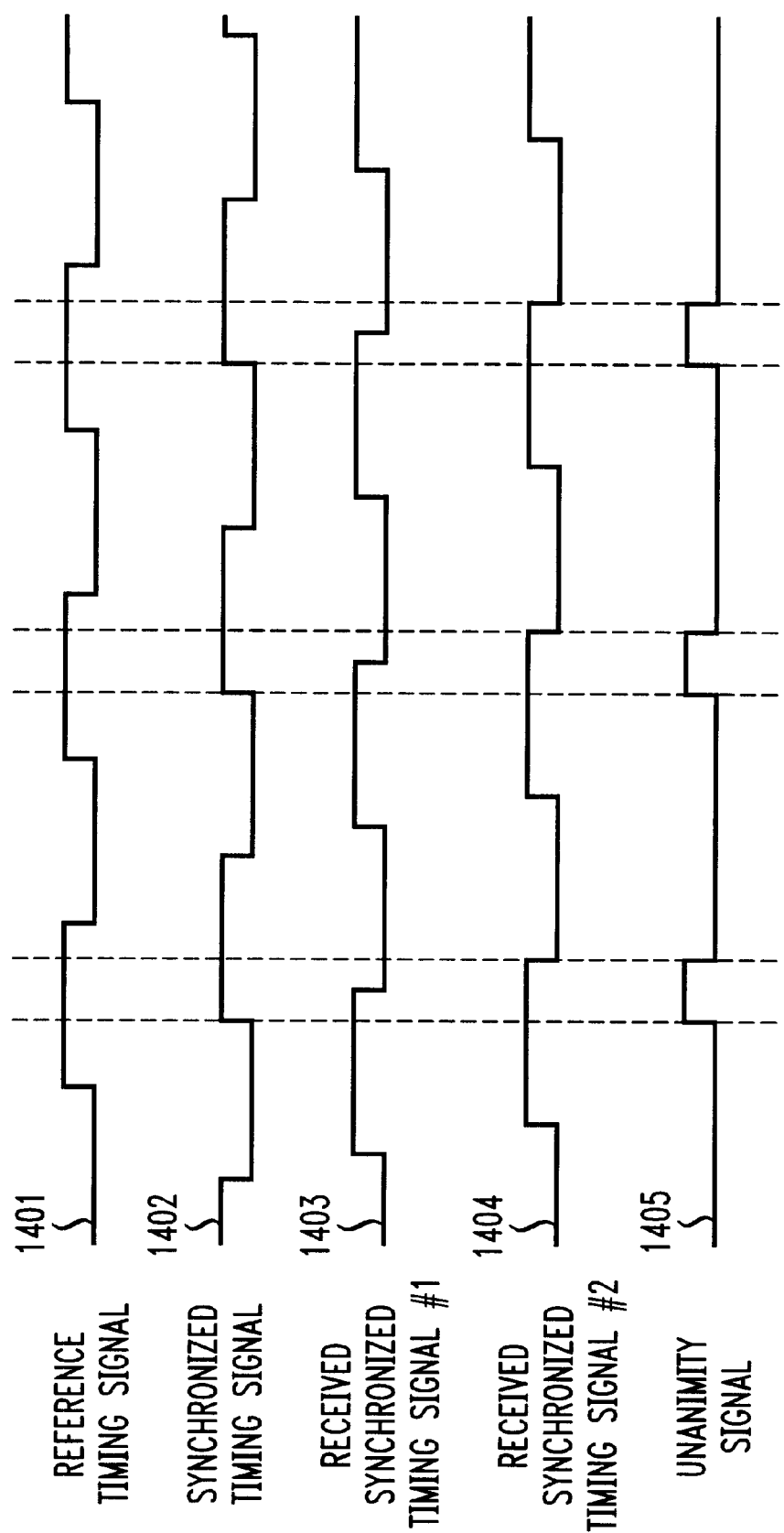

HANDING OFF A WIRELESS TERMINAL IN A WIRELESS TELECOMMUNICATIONS SYSTEM

FIELD OF THE INVENTION

The present invention relates to telecommunications in general, and, more particularly, to a technique for handing off a wireless terminal from one base station to another as the wireless terminal moves within a wireless telecommunications system.

BACKGROUND OF THE INVENTION

FIG. 1 depicts a schematic diagram of a portion of a wireless telecommunications system in the prior art, which system provides wireless telecommunications service to a number of wireless terminals (e.g., wireless terminals 101-1 through 101-3) that are situated within a geographic region. The heart of a wireless telecommunications system is a wireless switching center ("WSC"), which also may be known as a mobile switching center or mobile telephone switching office. Typically, a wireless switching center (e.g., WSC 120) is connected to a plurality of base stations (e.g., base stations 103-1 through 103-5) that are dispersed throughout the geographic region serviced by the system and to the local and long-distance telephone and data networks (e.g., local-office 130, local-office 138 and toll-office 140). A wireless switching center is responsible for, among other things, establishing and maintaining a call between a first wireless terminal and a second wireless terminal or, alternatively, between a wireless terminal and a wireline terminal (e.g., wireline terminal 150), which is connected to the system via the local and/or long-distance networks.

The geographic region serviced by a wireless telecommunications system is partitioned into a number of spatially distinct areas called "cells." As depicted in FIG. 1, each cell is schematically represented by a hexagon. In practice, however, each cell has an irregular shape that depends on the topography of the terrain surrounding the cell. Typically, each cell contains a base station, which comprises the radios and antennas that the base station uses to communicate with the wireless terminals in that cell and also comprises the transmission equipment that the base station uses to communicate with the wireless switching center.

For example, when a user of wireless terminal 101-1 desires to transmit information to a user of wireless terminal 101-2, wireless terminal 101-1 transmits a data message bearing the user's information to base station 103-1. The data message is then relayed by base station 103-1 to wireless switching center 120 via wireline 102-1. Because wireless terminal 101-2 is in the cell serviced by base station 103-1, wireless switching center 120 returns the data message back to base station 103-1, which relays it to wireless terminal 101-2.

Typically, a wireless terminal communicates with the base station that is nearest to it. But because a wireless terminal can move from cell to cell, the base station that the wireless terminal is nearest to can change. Therefore, a wireless terminal usually communicates with different base stations as it moves from cell to cell. For example, if wireless terminal 101-1 exits from the cell serviced by base station 103-1 and moves into the cell serviced by base station 103-2, wireless terminal 101-1 ends communication with base station 103-1 and begins communication with base station 103-2. The process in which a wireless terminal ends communication with one base station and begins communication with another is, for the purposes of this specification, defined as a "hand off."

Although there are several techniques in the prior art for performing a hand off, all of the techniques are similar in that they attempt to orchestrate the process so deftly that there is no perceptible interruption in service.

One technique in the prior art for performing a hand is known as "hard hand off." Before a hard hand off, a wireless terminal uses one pair of communications channels (one for transmitting, the other for receiving) for communicating with a first base station. At the moment when the wireless terminal exits the cell serviced by the first base station and enters the cell serviced by a second base station, the wireless terminal re-tunes its radio from the first pair of communications channels to a second pair of communications channels for communicating with a second base station. Furthermore, at the same moment that the wireless terminal re-tunes its radio, the wireless switching center stops using the first base station for communication with the wireless terminal and begins using the second base station.

For example, FIG. 2 depicts a block of spectrum that has been partitioned into four frequency bands, channel #1 through channel #4. If wireless switching center 120 assigns channels #1 and #2 to base station 103-1 and channels #3 and #4 to base station 103-2, then base station 103-1 could transmit in channel #1 and receive in channel #2, and base station 103-2 could transmit in channel #3 and receive in channel #4. Because neither base station 103-1 nor 103-2 use the same channels for communicating, there is no co-channel interference between the base stations.

To continue with the example, assume that when wireless terminal 101-1 is in the cell serviced by base station 103-1, wireless terminal 101-1 uses channels #1 and #2 to communicate with base station 103-1. Thereafter, when wireless terminal 101-1 exits the cell serviced by base station 103-1 and moves into the cell serviced by base station 103-2, wireless terminal 101-1 ends communications in channels #1 and #2 and begins communication in channels #3 and #4 with base station 103-4. Furthermore, at the moment that wireless terminal 101-1 re-tunes from channels #1 and #2 to channels #3 and #4, wireless switching center 120 stops routing the signals intended for wireless terminal 101-1 to base station 103-1 and begins routing the signals to base station 103-2. And still furthermore, at the moment that wireless terminal 101-1 re-tunes, wireless switching center 120 expects the signals from wireless terminal 101-1 to be received from base station 103-2, rather than from base station 103-1.

Hard hand off is advantageous in that it can be used with all multiplexing technologies (e.g., frequency-division multiplexing (hereinafter "FDM"), time-division multiplexing (hereinafter "TDM"), code-division multiplexing (hereinafter "CDM"), etc.) and all access technologies (e.g., frequency-division multiple access (hereinafter "FDMA"), time-division multiplex access (hereinafter "TDMA"), code-division multiple access (hereinafter "CDMA"), etc.). Hard hand off is further advantageous in that it is a rather simple process to implement.

Hard hand off is, however, disadvantageous in that it is a fragile process. If the re-tuning of wireless terminal 101-1 is not precisely synchronized with the switching from base station 103-1 to base station 103-2, then there could be an interruption in service. Such a lapse is not only an inconvenience, but also creates the perception that the quality of service offered by the wireless telecommunications system is inferior. This, in turn, causes customers to use competing services and/or to use less of the service than they might otherwise. The net result is that the owner of the wireless telecommunications system loses revenue because hand off in the prior art is such a fragile process.

A second technique in the prior art for handing off a wireless terminal is known as "soft hand off." Before a soft hand off, a wireless terminal uses one pair of communications channels (one for transmitting, the other for receiving) for communicating with a first base station. Before the wireless terminal exits the cell serviced by the first base station and enters the cell serviced by the second base station, the wireless terminal begins communications with the second base station on a second pair of channels. Thereafter, the wireless terminal communicates with both base stations on different pairs of channels until the wireless terminal ends communication with the first base station.

The salient difference between hard hand off and soft hand off is that with soft hand off there is no single moment when the wireless terminal stops using one base station and begins using the second. Rather, with soft hand off there is a significant interval (e.g., a few seconds or more) when the wireless terminal communicates with two base stations at the same time. In contrast, with hard hand off, there is no time when the wireless terminal communications with two base stations at the same time.

Soft hand off is advantageous in that it can be used with all multiplexing and access technologies. Soft hand off is further advantageous in that it is robust. The interim of overlapping communications creates redundancy and, therefore, it is less likely that there will be an interruption in service.

Soft hand off is disadvantageous, however, in three respects. First a wireless terminal capable of soft hand off must comprise two transceivers (one for communicating with each base station) and the circuitry needed to coordinate the two transceivers. This increases the cost of the wireless terminal considerably.

Second, a wireless switching center capable of soft hand off must comprise the circuitry needed to communicate with a wireless terminal through two independent channels. This increases the cost of the wireless switching center.

Third, soft hand off requires that a wireless terminal occasionally uses two sets of communications channels, which precludes the use of one of them by another wireless terminal. This lowers the traffic capacity of the telecommunications system.

Therefore, the need exits for a technique for handing off a wireless terminal from one base station to another that is robust and yet more economical to implement than soft hand off.

SUMMARY OF THE INVENTION

The present invention is a wireless telecommunications system that is capable of handing off a wireless terminal without some of the costs and disadvantages of techniques for hand off in the prior art. In particular, the present invention performs a hand off that is as robust as soft hand off, yet costs substantially less. In particular, a wireless terminal in accordance with the present invention needs only one transceiver and uses only one set of communications channels. Furthermore, the present invention is suitable for use with all multiplexing and access technologies and all current air interface standards (e.g., IS-41, IS-54, GSM, etc.).

The present invention is most easily understood by comparing and contrasting its salient characteristics with hard hand off in the prior art. In accordance with hard hand off, a wireless switching center, both base stations and a wireless terminal are all involved in the hand off process. In contrast, a hand off in accordance with the present invention can be performed without by just the wireless switching center and base stations—the wireless terminal can, but need not, participate and need not even know that a hand off has occurred.

In accordance with hard hand off, the wireless terminal re-tunes its transceiver. Instead, the present invention allows the wireless terminal to use the same communications channels both before and after the hand off.

In other words, in a hard hand off each base station is associated with a different pair of communications channels. Before the hand off, the wireless terminal uses one pair of communications channels for communications with a first base station. To accomplish the hand off, the wireless terminal re-tunes its transceiver to use a second pair of communications channels for communicating with a second base station. The salient characteristic of the prior art is that different pairs of communications channels are used for communicating with different base stations and the wireless terminal is responsible for re-tuning from the first pair to the second pair.

In accordance with the illustrative embodiment of the present invention, communications channels are not associated with a base station. Instead, each pair of communications channels are associated with a wireless terminal and the wireless terminal uses that pair of communications channels both before and after a hand off. Before the hand off, the wireless terminal uses the pair of communications channels for communicating with a first base station. To accomplish the hand off to a second base station, the first base station stops using the communications channels at the same time that the second base station starts using them.

The result is that although the wireless switching center must switch from using the first base station to the second base station, as with hard hand off, there is no re-tuning of the wireless terminal that it must be coordinated with. This permits the hand off to be very robust.

BRIEF DESCRIPTION OF THE DRAWINGS

FIG. 5 depicts a flowchart of the salient aspects of handing off the forward channel in accordance with the flowchart of FIG. 4.

FIG. 14 depicts a graph of the salient signals and their interrelationship in the illustrative embodiment of the present invention.

DETAILED DESCRIPTION

Figure 1:
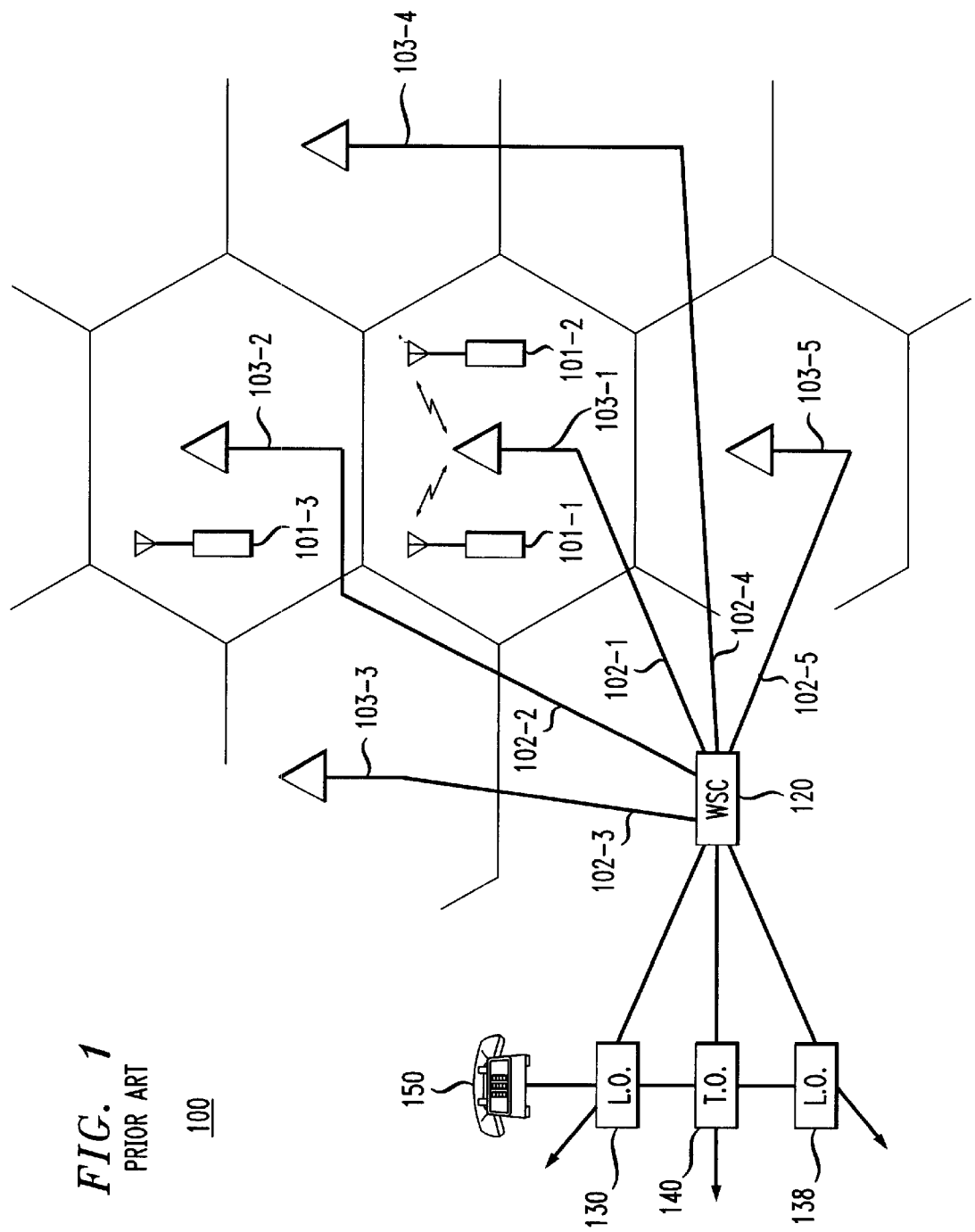
FIG. 1 depicts a schematic drawing of a wireless telecommunications system in the prior art.
Figure 2:
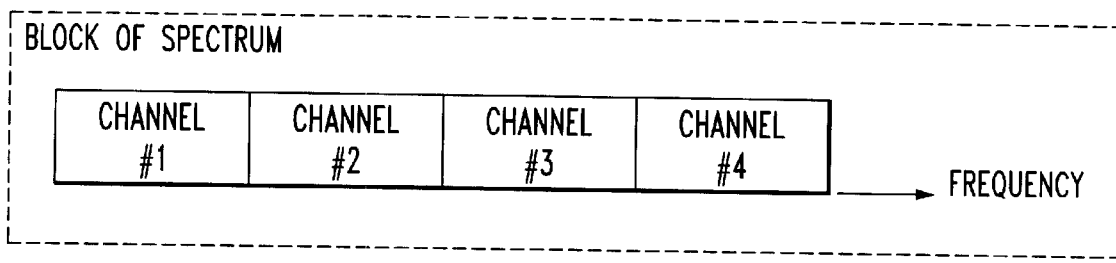
FIG. 2 depicts a map of a block of spectrum that is partitioned into a plurality of non-overlapping frequency bands.
Figure 3:
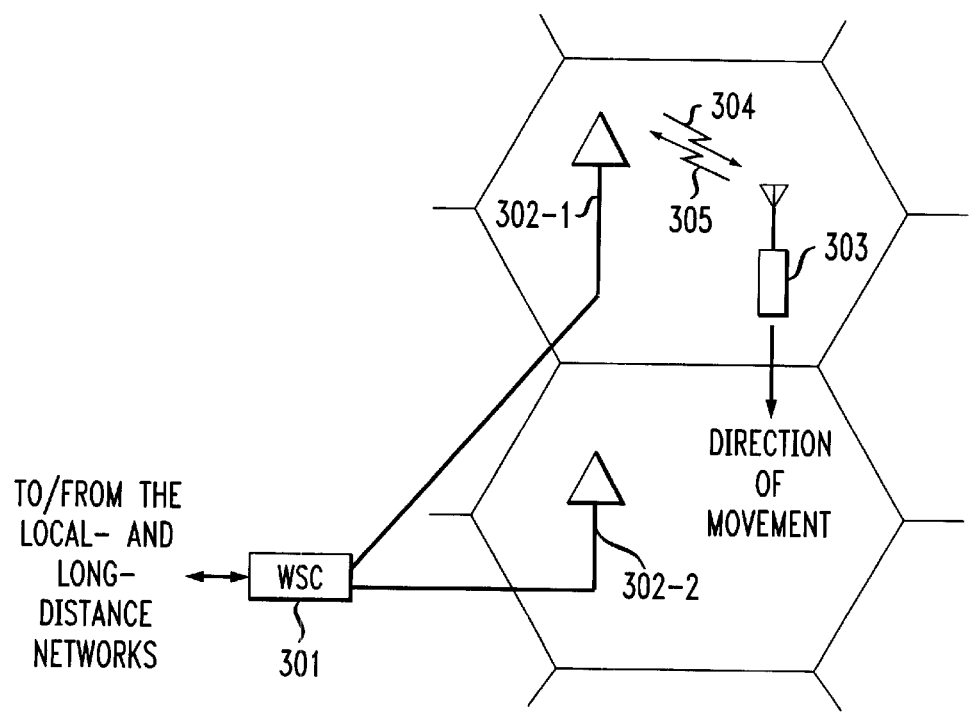
FIG. 3 depicts a schematic diagram of a portion of the illustrative embodiment of the present invention before hand off.

FIG. 3 depicts a schematic diagram of a portion of the illustrative embodiment of the present invention, which comprises: base stations 302-1 and 302-2 connected to wireless switching center 301 via wirelines 305-1 and 305-2, respectively, and wireless terminal 303. Wireless switching center 301 and base stations 302-1 and 302-2 provide wireless telecommunications service to wireless terminal 303, as wireless terminal 303 exits from the cell serviced by base station 302-1 and moves into the cell serviced by base station 302-2. As wireless terminal 303 exits from the cell serviced by base station 302-1 and moves into the cell serviced by base station 302-2, wireless terminal 303 is handed off from base station 302-1 to base station 302-2.

Figure 4:
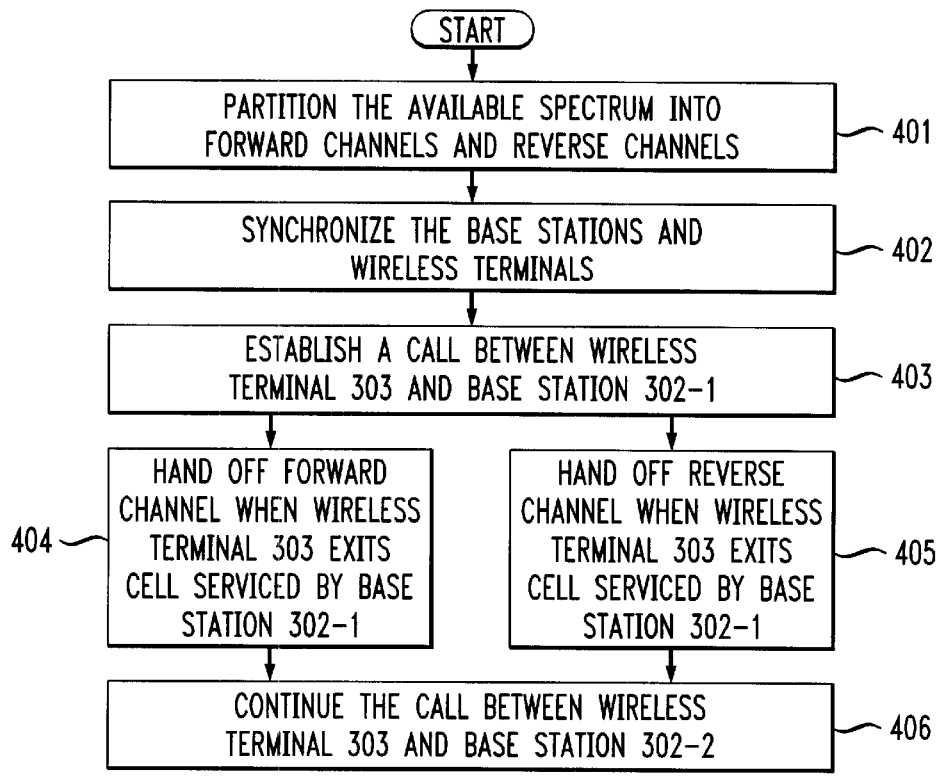
FIG. 4 depicts a flowchart of the operation of the illustrative embodiment of the present invention.

FIG. 4 depicts a flowchart of the steps involved in handing off wireless terminal 303 from base station 302-1 to base station 302-2, in accordance with the illustrative embodiment of the present invention.

At step 401, the available spectrum is partitioned into one or more forward channels and one or more reverse channels, in well-known fashion. Furthermore, both base station 302-1 and base station 302-2 are advantageously capable of transmitting on all forward channels and of receiving on all reverse channels.

For the purpose of this specification, a "forward channel" is defined as a communications channel that carries a call from a base station to a wireless terminal. Because the illustrative embodiment can communicate with more than one wireless terminal, it must use a mechanism to prevent the forward channels from interfering with each other. The mechanism used to separate the forward channels is known as a multiplexing technology and the present invention can be used with any multiplexing technology.

When an embodiment of the present invention uses frequency-division multiplexing, only one forward channel is carried in a frequency band. Typically, a forward channel in a frequency-division multiplexed frequency band is identified by the frequency band that is uniquely associated with that forward channel.

When time-division multiplexing is used, a plurality of forward channels time-share the use of a single frequency band. The frequency band is temporally partitioned into a succession of time-slots and the base station transmits to each of a plurality of wireless terminals in the time-slots. Typically, a forward channel in a time-division multiplexed frequency band is identified by the time-slot that is uniquely associated with that forward channel.

When code-division multiplexing is used, a plurality of forward channels share the use of a single frequency band. Furthermore, each forward channel is transmitted at the same frequency and at the same time. In accordance with code-division multiplexing, the base station multiplies each call to a wireless terminal with a code that is orthogonal to the code used to multiply the calls to the other wireless terminals. Each wireless terminal can demultiplex a call transmitted to it by multiplying the received composite signal by the code that was used by the base station to multiply the call. Typically, a forward channel in a code-division multiplexed frequency band is identified by the code that is uniquely associated with that forward channel.

For the purpose of this specification, a "reverse channel" is defined as a communications channel that carries a call from a wireless terminal to a base station. Because the illustrative embodiment can communicate with more than one wireless terminal, it must use a mechanism to prevent the reverse channels from interfering with each other. The mechanism used to separate the reverse channels is known as an access technology and the present invention can be used with any access technology.

When an embodiment of the present invention uses frequency-division multiple access, only one reverse channel is carried in a frequency band. Typically, a reverse channel in a frequency-division multiplexed frequency band is identified by the frequency band that is uniquely associated with that reverse channel.

When time-division multiple access is used, a plurality of reverse channels time-share the use of a single frequency band. The frequency band is temporally partitioned into a repeating cycle of time-slots and each of n wireless terminals transmit into the time-slots. Typically, a reverse channel in a time-division multiplexed frequency band is identified by the time-slot that is uniquely associated with that reverse channel.

When code-division multiple access is used, a plurality of reverse channels share the use of a single frequency band. Furthermore, each reverse channel is transmitted from a different wireless terminal at the same frequency and at the same time. In accordance with code-division multiple access, each wireless terminal multiplies its call to the base station with a code that is orthogonal to the code used to multiply the calls from the other wireless terminals. The base station can demultiplex the reverse channels by multiplying the received composite signal by the codes that was used by the wireless terminals to multiply its call. Typically, a reverse channel in a code-division multiplexed frequency band is identified by the code that is uniquely associated with that reverse channel.

It will be clear to those skilled in the art how to partition the available spectrum into one or more forward channels and one or more reverse channels. For example, if a channel requires a 30 KHz band of spectrum, a 30 MHz allocation of spectrum could be partitioned into 1000 channels. Because each wireless terminal requires one forward channel for receiving signals from a base station and one reverse channel for transmitting signals to the base station, then 500 of the 1000 channels can be assigned as forward channels and the other 500 as reverse channels.

At step 402, each base station's transmissions and each wireless terminal's transmissions are synchronized so that each frame and each time-slot begins and ends at the same time. If the margin of error in synchronization is more than one-half of the duration of a time-slot, the advantages of the illustrative embodiment will be largely eliminated. The utility of the present invention improves as the margin of error in synchronization is reduced to less than one-half of the duration of a bit or symbol. For the purposes of this specification, a "bit" is defined as a single binary signal and a "symbol" is defined as a single signal that has two or more possible values. It will be clear to those skilled in the art how to synchronize the transmissions in the system to less than one-half the duration of a bit or symbol with, for example, a satellite positioning system (e.g., Global Positioning System receiver, etc.) at each base station. Another technique for synchronizing transmissions is taught in the Appendix to this specification.

At step 403, wireless terminal 303 establishes a call with base station 302-1, which call comprises forward channel 304 and reverse channel 305, in well-known fashion. It will be clear to those skilled in the art that the call can originate with either wireless terminal 303 or with another wireless terminal or with a wireline terminal that is connected to wireless switching center 301 via the local- and/or long-distance networks. When wireless terminal 303 moves beyond the boundary of the cell serviced by base station 302-1, a hand-off is triggered and control passes to both steps 404 and 405 simultaneously.

A hand off of wireless terminal 303 from base station 302-1 to base station 302-2 involves two distinct steps: (1) the handing off of forward channel 304, and (2) the handing off of reverse channel 305. Step 404 depicts the handing off of forward channel 304 and step 405 depicts the handing off of reverse channel 305. Although steps 404 and 405 are advantageously performed concurrently, the two steps are independent and one can be done before the other. Furthermore, for wireless telecommunications systems that use only a forward channel (e.g., paging systems, etc.) or only use a reverse channel (e.g., tracking and monitoring systems, etc.), it will be clear to those skilled in the art that either step 404 or 405 can be omitted.

Figure 6:
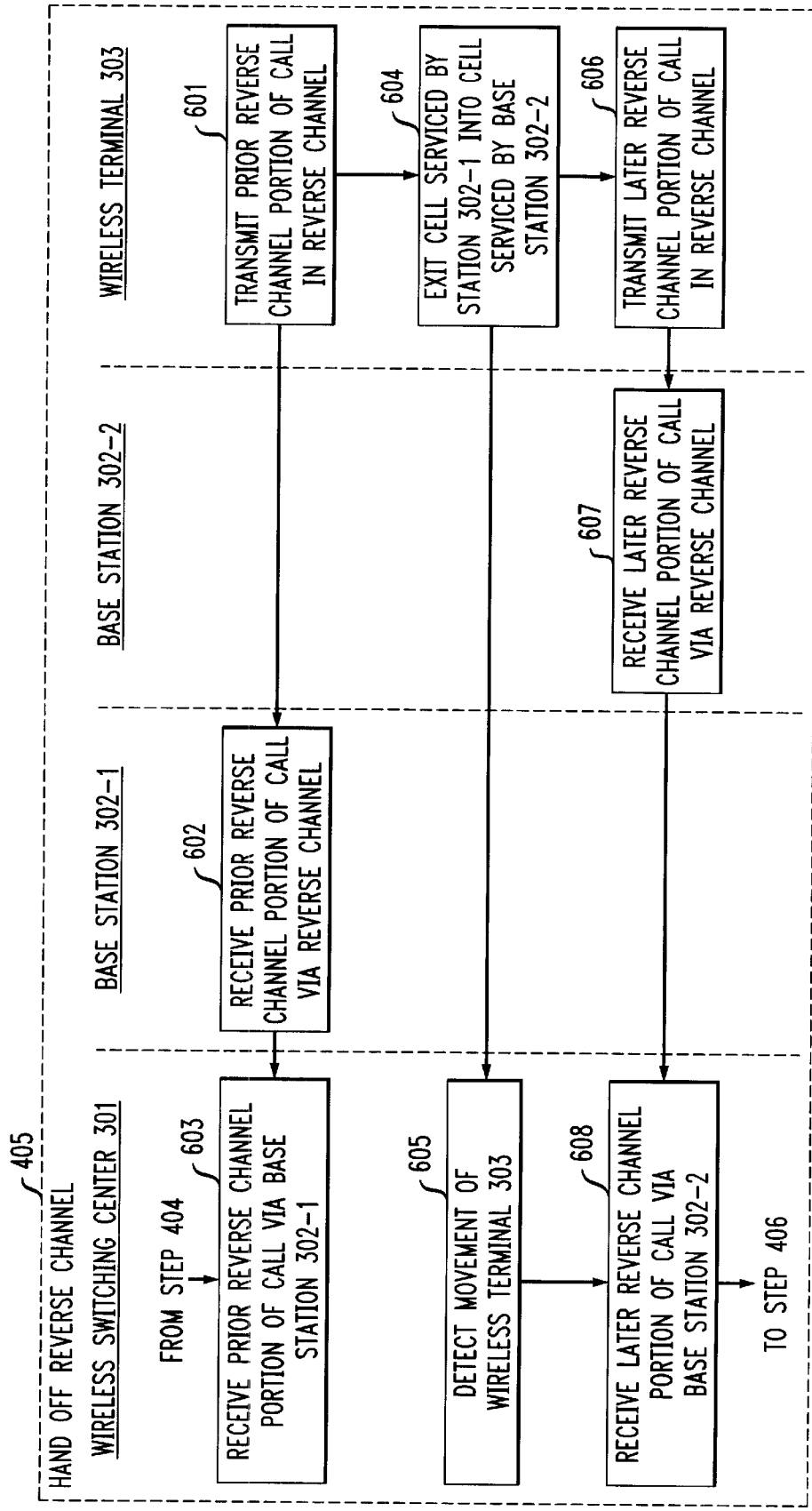
FIG. 6 depicts a flowchart of the salient aspects of handing off the reverse channel in accordance with the flowchart of FIG. 4.

Because the procedure for handing off forward channel 304 is different than the procedure for handing off reverse channel 305, the two procedures are discussed separately. FIG. 5 depicts the salient aspects of handing off forward channel 304 and is discussed first. In contrast, FIG. 6 depicts the procedure for handing off reverse channel 305 and is discussed afterwards.

As step 404 begins, wireless terminal 303 is in the cell serviced by base station 302-1 and is engaged in a call. The call comprises both a forward channel portion, which is transmitted from base station 302-1 to wireless terminal 303 in a forward channel, and a reverse channel portion, which is transmitted from wireless terminal 303 to base station 302-1 in a reverse channel.

Because the call exists both before and after hand off, and because the call comprises both a forward channel portion and a reverse channel portion, the different aspects of the call are defined so that they can be discussed without ambiguity. Therefore, for the purpose of this specification:

the term "prior forward channel portion" of a call is defined as that portion of a call that is transmitted in a forward channel before hand off;

the term "later forward channel portion" of a call is defined as that portion of a call that is transmitted in a forward channel after hand off;

the term "prior reverse channel portion" of a call is defined as that portion of a call that is transmitted in a reverse channel before hand off; and the term "later reverse channel portion" of a call is defined as that portion of a call that is transmitted in a reverse channel after hand off.

At step 501, wireless switching center 301 transmits the prior forward channel portion of the call to base station 302-1 and directs base station 302-1 to transmit it to wireless terminal 303 in forward channel 304. Furthermore, wireless switching center 301 also directs base station 302-2 to transmit nothing (not even an unmodulated carrier) in forward channel 304, so as to prevent cochannel interference between base stations 302-1 and 302-2.

At step 502, base station 302-1 transmits the prior forward channel portion of the call to wireless terminal 303, in well-known fashion, and at step 503, base station 302-2 transmits nothing in forward channel 304.

At step 504, wireless terminal 303 receives the prior forward channel portion of the call in forward channel 304, in well-known fashion.

At step 506, wireless terminal 303 exits from the cell serviced by base station 302-1 and moves into the cell serviced by base station 302-2. Any mode of transportation (e.g., walking, driving, flying, bicycling, etc.) can be used to move wireless terminal 303 from the cell serviced by base station 302-1 and moves into the cell serviced by base station 302-2.

Furthermore, as will be clear to those skilled in the art, wireless terminal 303 can be stationary while the boundaries of the cells serviced by base stations 302-1 and 302-2 move through wireless terminal 303. The movement of cell boundaries, which is sometimes called "cell breathing," can be performed by wireless switching center 301 to ease the burden on a base station when there are too many wireless terminals for the base station to manage effectively. In accordance with cell breathing, the boundaries of the cell serviced by the burdened base station are contracted so that the wireless terminals near the boundary of the cell are effectively moved into an adjacent cell. Those skilled in the art will appreciate that embodiments of the present invention are completely compatible with wireless systems that employ cell breathing.

Whether wireless terminal 303 moves across the cell boundary or because of cell breathing the boundary moves through wireless terminal 303, when wireless terminal 303 exits the cell serviced by base station 302-1, it is detected, at step 507, by wireless switching center 301. It will be clear to those skilled in the how wireless switching center 301 detects when wireless terminal 303 exits the cell serviced by base station 302-1. For example, when base station 302-1 determines that the strength of the signal from wireless terminal 303 falls below a specific threshold, which indicates that wireless terminal 303 should be handed off to another base station, base station 302-1 transmits a message indicating such to wireless switching center 301.

At step 508, wireless switching center 301 begins the process of handing off forward channel 304. From the perspective of wireless switching center 301, the process of handing off forward channel 304 comprises four components:

(1) direct base station 302-1 to end transmission of the prior forward channel portion of the call in forward channel 304, (2) direct base station 302-1 to transmit nothing thereafter (not even an unmodulated carrier) in forward channel 304, (3) transmit the later forward channel portion of the call to base station 302-2, and (4) direct base station 302-2 to begin transmission of the later forward channel portion of the call in forward channel 304 concurrently with the end of transmission by base station 302-1.

At step 509, base station 302-1 ends transmission in forward channel 304 and thereafter does not transmit any signal (not even an unmodulated carrier) into forward channel 304, so as to prevent co-channel interference between base stations 302-1 and 302-2.

At step 510, base station 302-2 begins transmitting the later forward channel portion of the call to wireless terminal 303 concurrently with the end of transmission by base station 302-1.

At step 511, wireless terminal 303 receives the later forward channel portion of the call in forward channel 304 from base station 302-2, in well-known fashion. It will be clear to those skilled in the art that in accordance with the illustrative embodiment, wireless terminal 303 need not re-tune its receiver to affect the hand off of forward channel 304. Furthermore, when base station 302-2 begins transmitting the later forward channel portion of the call concurrently with the end of transmission by base station 302-1, wireless terminal 303 may not even be aware that it has been handed off. From step 511 control passes to step 406, which will be discussed below after the detailed discussion of step 405.

FIG. 6 depicts in detail the salient aspects of handing off reverse channel 305 in step 405.

Steps 601, 602 and 603 are performed currently and represent the state of the illustrative embodiment before the hand off has occurred. At step 601, wireless terminal 303 is in the cell serviced by base station 302-1 and transmits the prior reverse channel portion of the call in reverse channel 305. Wireless terminal 303 does not transmit the prior reverse channel portion of the call to any particular base station, but radiates it omni-directionally so that it is received by base station 302-1. Base station 302-2 may also be capable of receiving the prior reverse channel portion of the call before the hand off, but it is not necessary.

Furthermore, wireless terminal 303 is advantageously the only device transmitting in reverse channel 305 in either the cell serviced by base station 302-1 or the base station serviced by 302-2, so as to prevent co-channel interference in reverse channel 305. This is coordinated by wireless switching center 301, which knows where every wireless terminal is and what channels it is using, and, therefore, is in the position to prevent two devices from transmitting in the same channel in the same or nearby cells.

At step 602, base station 302-1 receives the prior reverse channel portion of the call via reverse channel 305 and forwards it to wireless switching center 301.

At step 603, wireless switching center 301 accepts the signals arriving from base station 302-1 as the prior reverse channel portion of the call from wireless terminal 303.

At step 604, wireless terminal 303 exits from the cell serviced by base station 302-1 and moves into the cell serviced by base station 302-2. Step 604 in FIG. 6 is the same as step 506 in FIG. 5, as discussed above. When wireless terminal 303 exits from the cell serviced by base station 302-1 and moves into the cell serviced by base station 302-2, it is detected by wireless switching center 301 in step 605.

At step 605, the detection by wireless switching center 301 of the movement of wireless terminal 303 triggers the hand off of reverse channel 305 in steps 606, 607 and 608.

Steps 606, 607, and 608 are performed currently and represent the state of the illustrative embodiment after the hand off has occurred.

At step 606, wireless terminal 303 is in the cell serviced by base station 302-2 and transmits the prior reverse channel portion of the call in reverse channel 305. Wireless terminal 303 does not transmit the prior reverse channel portion of the call to any particular base station, but radiates it omni-directionally so that it is received by base station 302-2. Base station 302-1 may also be capable of receiving the prior reverse channel portion of the call before the hand off, but it is not necessary. A salient characteristic of the illustrative embodiment is that wireless terminal 303 need not be aware that it has progressed from step 601 to 604 to 606. The hand off can be completely transparent and wireless terminal 303 need not re-tune its transmitter or change its signaling in any way. Like the hand off forward channel 304, the hand off of reverse channel 305 is accomplished completely by wireless switching center 301 and base stations 302-1 and 302-2.

At step 607, base station 302-2 receives the later reverse channel portion of the call via reverse channel 305 and forwards it to wireless switching center 301. Advantageously, base station 302-2 begins receiving the later reverse channel portion of the call at the same time that wireless switching center 301 instructs base station 302-2 to begin transmitting the later forward channel portion of the call.

At step 608, wireless switching center 301 accepts the signals arriving from base station 302-2 as the prior reverse channel portion of the call from wireless terminal 303, rather than the signals arriving from base station 302-1, and the hand off of reverse channel 305 is complete. From step 608, control passes to step 406 in FIG. 4.

At step 406, the hand off of both forward channel 304 and reverse channel 305 are complete, and the call is continued between wireless terminal 303 and base station 302-2.

Figure 7:
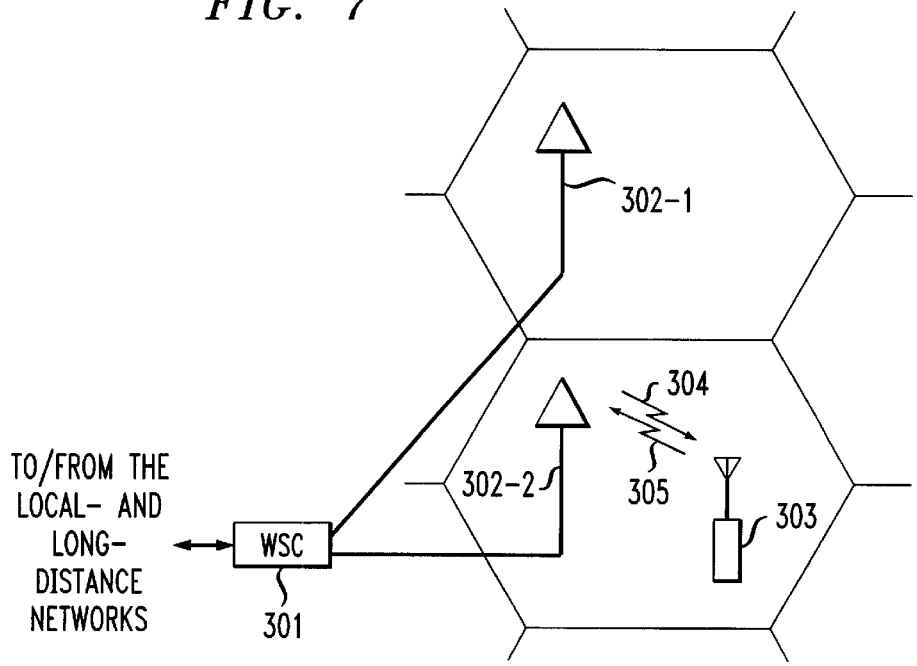
FIG. 7 depicts a schematic diagram of a portion of the illustrative embodiment of the present invention after hand off.

FIG. 7 depicts the illustrative embodiment of the present invention after the hand off of both forward channel 304 and reverse channel 305 are complete, and the call is continued between wireless terminal 303 and base station 302-2.

Appendix

This appendix teaches a technique for synchronizing the transmissions in a wireless telecommunications system.

Each wireless terminal and each base station comprises a timing signal that it uses for timing its communications with the other. Typically, the timing signal does not provide the exact time (e.g., 3:18 A.M.), but is a waveform with a constant frequency that establishes a cadence for the wireless terminals and base stations to follow.

The ease with which a wireless terminal and a base station can communicate is dependent on the degree to which the timing signal in the wireless terminal and the timing signal in the base station are synchronized. In other words, if the timing signal in the wireless terminal and the timing signal in the base station are not synchronized, communication between the wireless terminal and the base station may be difficult or impossible.

Figure 9:
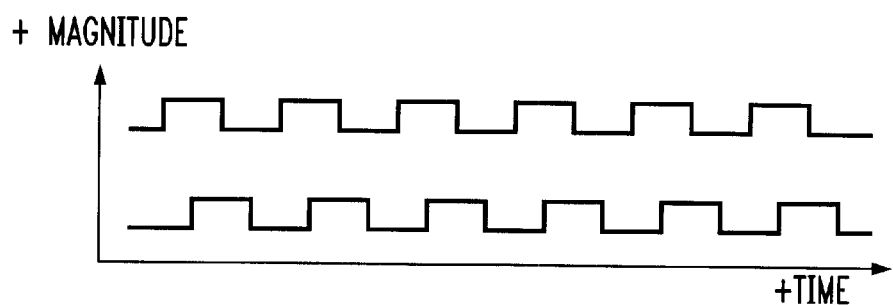
FIG. 9 depicts a graph of two timing signals that are synchronous in frequency, but asynchronous in phase.
Figure 10:
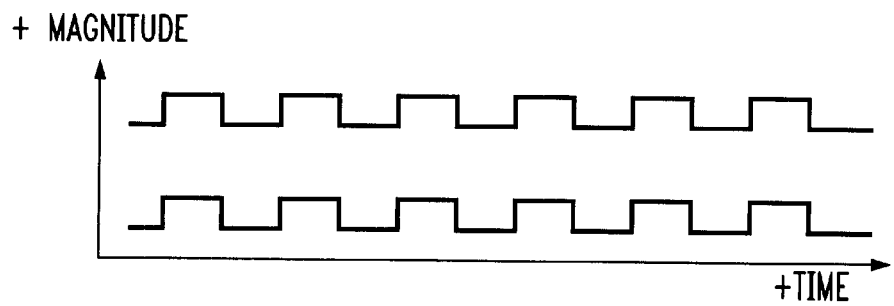
FIG. 10 depicts a graph of two timing signals that are synchronous.

The degree of synchronization of two or more timing signals is not definable by a single parameter. Instead, the degree of synchronization is defined by two parameters: (1) frequency, and (2) phase. To illustrate the relationship and meaning of these two parameters, FIGS. 8 through 10 depict graphs of pairs illustrative timing signals.

Figure 8:
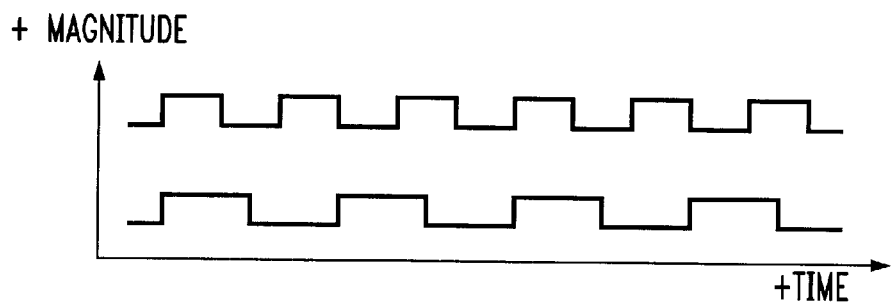
FIG. 8 depicts a graph of two timing signals that are asynchronous in frequency.

FIG. 8 depicts a graph of two timing signals that are not synchronized because they have different frequencies. In contrast, FIG. 9 depicts a graph of two timing signals that have the same frequency, but are still not synchronized because they have different phases. And finally, FIG. 10 depicts a graph of two timing signals that are synchronized because they have the same frequency and the same phase. In general, for a wireless terminal and a base station to be able to communicate, the timing signal in the wireless terminal and the timing signal in the base station must have the same frequency and nearly the same phase.

It is well known how to synchronize a timing signal in a wireless terminal and a timing signal in a base station. In accordance with one technique, the base station transmits its timing signal to the wireless terminal. Periodically or sporadically or continually, the wireless terminal uses the timing signal from the base station to synchronize its own timing signal. Because the base station directs the wireless terminal to synchronize its timing signal to that of the base station, but the base station does not synchronize its timing signal to that of the wireless terminal, the relationship of the base station and the wireless terminal is asymmetric. In particular, the base station acts like a master and the wireless terminal acts like a slave.

There are occasions when a wireless terminal needs to communicate with two or more base stations simultaneously or in relatively short succession. In this case, the timing signal in the wireless terminal is advantageously synchronized with the timing signals in all of the base stations with which it communicates. By implication, this requires that the timing signals in all of the base stations be synchronized with each other. In other words, when a wireless terminal needs to communicate with two or more base stations, the timing signal in the wireless terminal needs to be synchronized with the timing signals in all of the base stations, and all of the base stations' timing signals need to be synchronized with each other. To accomplish this, the base stations synchronize their timing signals with each other and the wireless terminal synchronizes its timing signal with that of one of the base stations.

There are three techniques for synchronizing the timing signals of multiple base stations.

In accordance with the first technique, each base station comprises an independent but highly-accurate timing source, such as a cesium clock whose rate of vibration is well-known and very stable under a wide range of environmental conditions. This technique is advantageous because it effectively ensures that each base station's timing signals are synchronized in frequency. This technique is disadvantageous, however, because the independence of the timing sources does nothing to synchronize the timing signals in phase. Therefore, this technique is bound to produce timing signals that are synchronized in frequency, but not phase, such as those shown in FIG. 9.

In accordance with the second technique, all of the base stations derive their timing signals from a reference timing signal that is transmitted from a single timing source. Typically, the timing source is located in a wireless switching center and the reference timing signal is transmitted to each base station via the wireline associated with that base station. Like the first technique, the second technique is advantageous because it effectively ensures that each base station's timing signals are synchronized in frequency. Also like the first technique, the second technique is disadvantageous because the base stations' timing signals are not synchronized in phase.

The reason has to do with geography. Because not all of the base stations are equidistant from the common master timing signal, the reference timing signal must traverse a different distance from the timing source to each base station. And because the reference timing signal propagates from the timing source to each base station at the same velocity, the reference timing signal arrives at each base station at a slightly different time. The arrival of the timing signal at each base station at a slightly different time exhibits itself as a phase disparity in the respective timing signals at the base stations.

In accordance with the third technique, each base station derives the frequency of its timing signal from one periodic signal, but the phase of its timing signal from a second periodic signal. In general, the base station derives its timing signal based on: (1) the frequency of a reference timing signal, and (2) the phase of a feedback signal. In particular, the base station accomplishes this by phase aligning the reference timing signal to a feedback signal to create the base station's timing signal.

The reference timing signal can be obtained from a common timing source or from different timing sources which are designed to have the same frequency.

The feedback signal is advantageously the confluence of two feedback loops. In accordance with the first feedback loop, the feedback signal is based on the phase of the base station's own timing signal. In accordance with the second feedback loop, the feedback signal is based on the phase of the timing signals from one or more nearby base stations. Advantageously, the feedback signal is based on the Boolean AND or NAND function of the base station's own timing signal and the timing signals of the nearby base stations.

The use of two feedback loops is advantageous because it enables the base stations to achieve and maintain synchronization automatically, even if there are changes in the reference timing signals or the timing signals of one or more base stations. When each base station in the illustrative embodiment follows this regimen, each base station's timing signal becomes synchronized in both frequency and phase with the timing signals of the nearby base stations.

FIG. 5 depicts a schematic diagram of a portion of a wireless telecommunications system, which provides wireless telecommunications service to one or more wireless terminals within a geographic region. The wireless telecommunications system comprises: wireless switching center 1101, base stations 1103-1 through 1103-4, and wirelines 1102-1 through 1102-4, interrelated as shown. Although the wireless telecommunications system comprises four base stations, it will be clear to those skilled in the art how to make and use wireless telecommunications systems that comprise any number of base stations.

In accordance with the wireless telecommunications system, a reference timing signal is provided to each of base stations 1102-1 through 1102-4. Advantageously, the reference timing signal is a periodic waveform with only two values (e.g., a square wave, etc.).

The reference timing signal can be provided to each base station by either: (1) a central timing source, or (2) a local timing source. For example, a reference timing signal can be provided to one or more base stations from a central timing source, which may be co-located with the wireless switching center and carried to the base stations via a wireline. Alternatively, a reference timing signal can be provided to a base station from a local timing source, which is co-located with the base station. It will be clear to those skilled in the art that some of the base stations can receive their reference timing signal from a central timing source while the other base stations receive their reference timing signal from local timing sources. Regardless of the source of each reference timing signal, it is important that each reference timing signal has the same frequency—it is not, however, necessary that they be synchronized in phase.

Each of base stations 1102-1 through 1102-4 use the reference timing signal it receives to generate a timing signal. Advantageously, the timing signal is a periodic waveform with only two values (e.g., a square wave, etc.). The details of how the timing signal is generated are discussed below in conjunction with FIG. 12.

The timing signals of the respective base stations are synchronized in both frequency and phase and have four uses:

1) each base station uses its timing signal for timing the communications with the wireless terminals it serves;
2) each base station transmits its timing signal to the wireless terminals it services for use by those wireless terminals in synchronizing their timing signals;
3) each base station transmits its timing signals to one or more nearby base stations; and
4) each base station uses the timing signals transmitted from one or more nearby base stations to generate its own timing signal.

In other words, to ensure that the timing signal generated by each base station is, in fact, synchronized (in both frequency and phase) with the timing signals generated by the other base stations, each base station advantageously generates its timing signal based on:

1) the frequency of its own reference timing signal,
2) the phase of its own timing signal, and
3) the phase of the timing signals received from one or more nearby base stations.

Figure 12:
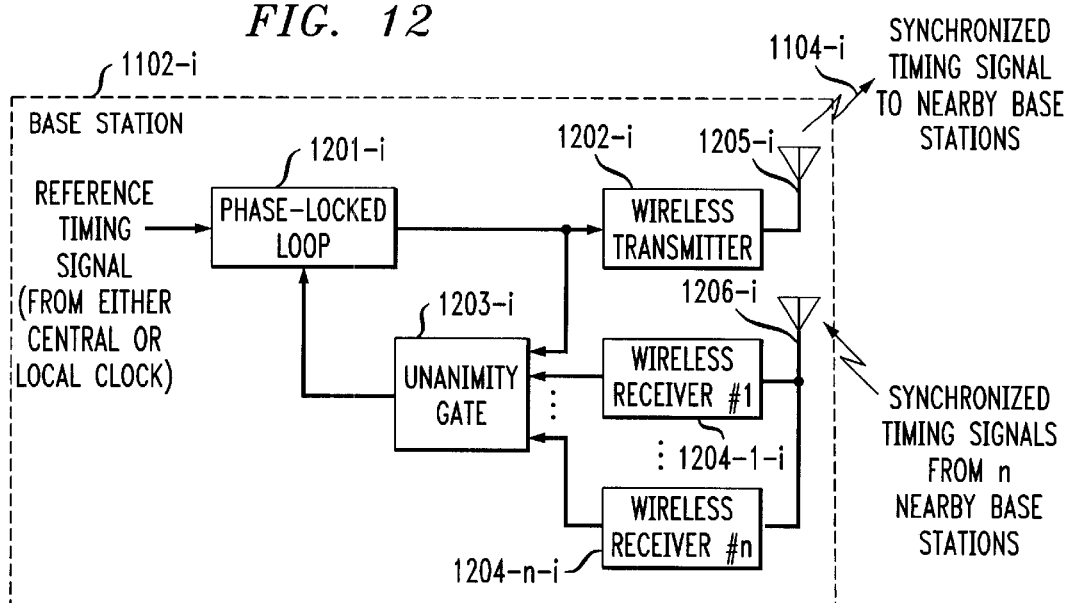
FIG. 12 depicts a block diagram of the salient components of a base station in accordance with the illustrative embodiment of the present invention.
Figure 13:
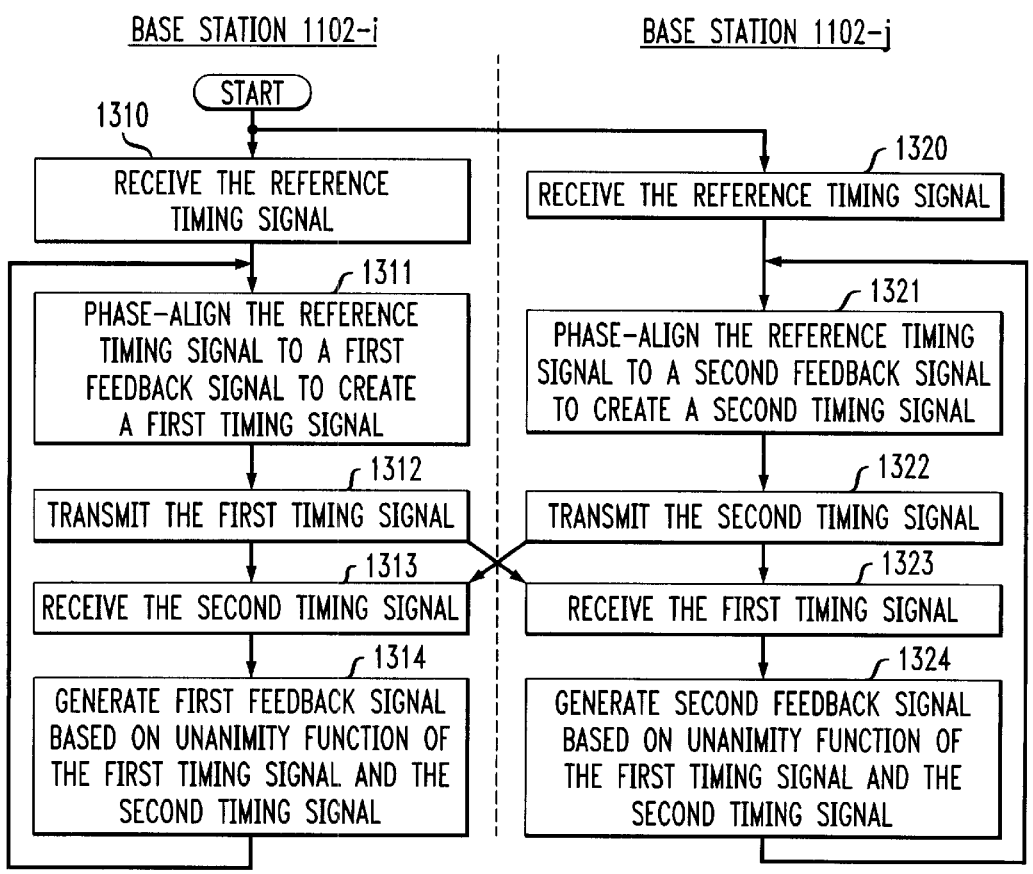
FIG. 13 depicts a flowchart of the operation of the illustrative embodiment of the present invention.

The following description, in conjunction with FIGS. 12 through 14, discusses how each base station generates its timing signal.

FIG. 12 depicts a block diagram of the salient components of base station 1102-i, for i=1 to 4, which advantageously comprises: phase-locked loop 1201, wireless transmitter 1202, unanimity gate 1203, wireless receivers 1204-1 through 1204-n, transmit antenna 1205, and receive antenna 1206, interconnected as shown. The function of these components is described first, and then their operation and interrelationship is described in conjunction with FIGS. 13 and 14.

Phase-locked loop 1201 receives two inputs: (1) a reference timing signal on lead 1103-i, and (2) a feedback signal from unanimity gate 1203. Phase-locked loop 1201 phase aligns the reference timing signal to the feedback signal, in well-known fashion, to create the timing signal. The timing signal from phase-locked loop 1201 is fed into wireless transmitter 1202 and to one input of unanimity gate 1203. The feeding of the timing signal from phase-locked loop 1201 into an input of unanimity gate 1203 is, which generates an input to phase-locked loop 1201, is one feedback loop used by the wireless telecommunications system.

Wireless transmitter 1202 transmits the timing signal via transmit antenna 1205, in well-known fashion, to the wireless terminals serviced by base station 1103-i and to one or more nearby base stations. In an analogous manner, the nearby base stations use the timing signal transmitted by wireless transmitter 1202 to generate their own timings signals, which are transmitted by them and received by receive antenna 1206.

Receive antenna 1206 receives the timing signals from n nearby base stations, where n≧1, and feeds the signals to wireless receivers 1204-1 through 1204-n. Each of wireless receivers 1204-1 through 1204-n outputs a timing signal from one of the n nearby base stations to unanimity gate 1203.

A feedback signal from unanimity gate 1203 is a Boolean function of its inputs. In particular, a feedback signal from unanimity gate 1203 is true, or high, when and only when all of its inputs have the same value. For example, unanimity gate 1203 can be a Boolean AND gate or a Boolean NAND gate, in well-known fashion. The use of the timing signals from other base stations, which are generated based on the timing signal of this base station, to generate the timing signal of this base station is the second feedback loop used by the wireless telecommunications system.

FIG. 13 depicts a flowchart of the operation of the wireless telecommunications system, which synchronizes the timing signals of two base stations: base station 1102-i and base station 1102-j.

At step 1310, base station 1103-i receives a first reference timing signal, as discussed above, in well-known fashion.

At step 1311, the first reference timing signal is phase aligned with phase-locked loop 1201-i to a feedback signal from unanimity gate 1203-i, as discussed above. The output of the phase-locked loop 1201-i is the timing signal for base station 1103-i and is fed to unanimity gate 1203-i and wireless transmitter 1202-i. It will be clear to those skilled in the art how to make and use phase-locked loop 1201-i.

At step 1312, wireless transmitter 1202-i transmits the timing signal via transmit antenna 1205-i to one or more nearby base stations (e.g., base station 1102-j), in well-known fashion.

At step 1313, base station 1103-i receives n timing signals from n nearby base stations (e.g., base station 1102-j), via n separate control channels, in well-known fashion. For example, in accordance with most air-interface standards (e.g., IS-41, IS-56, IS-95, GSM, etc.) each base station transmits a timing signal in a control channel for the benefit of the wireless terminals that it services. This timing signal is, as is described above, used by the wireless terminals for synchronizing their own clocks to that of the base station.

The timing signal is transmitted by the base station in a control channel. A control channel is analogous to a traffic channel except that it is used for transmitting timing and other control information instead of telecommunications traffic. Furthermore, the control channels from different base stations are distinguishable from each other in that same manner that the traffic channels from different base stations are distinguishable from each other (i.e., the control channels are distinguishable by frequency, time, or orthogonal code).

Because each base station 1103-i is capable of receiving n timing signals from n nearby base stations in n control channels, base station 1103-i directs each of wireless receivers 1204-1 through 1204-n to receive and demodulate one of the n incoming timing signals and to provide it to unanimity gate 1203-i. It will be clear to those skilled in the art how to make and use base station 1103-i so that it receives n timing signals from n other base stations.

At step 1314, the timing signal from phase-locked loop 1201-i is input to unanimity gate 1203-i with the n timing signals from n other base stations. The feedback signal from unanimity gate 1203-i is used in step 1311, as discussed above.

At step 1320, base station 1103-j receives a second reference timing signal, as discussed above, in well-known fashion.

At step 1321, the second reference timing signal is phase aligned with phase-locked loop 1201-j to a feedback signal from unanimity gate 1203-j, as discussed above. The output of the phase-locked loop 1201-j is the timing signal for base station 1103-j and is fed to unanimity gate 1203-j and wireless transmitter 1202-j. It will be clear to those skilled in the art how to make and use phase-locked loop 1201-j.

At step 1322, wireless transmitter 1202-j transmits the timing signal via transmit antenna 1205-j to one or more nearby base stations (e.g., base station 1102-i), in well-known fashion.

At step 1323, base station 1103-j receives n timing signals from n nearby base stations (e.g., base station 1102-i), via n separate control channels, in well-known fashion. For example, in accordance with most air-interface standards (e.g., IS-41, IS-56, IS-95, GSM, etc.) each base station transmits a timing signal in a control channel for the benefit of the wireless terminals that it services. This timing signal is, as is described above, used by the wireless terminals for synchronizing their own clocks to that of the base station.

The timing signal is transmitted by the base station in a control channel. A control channel is analogous to a traffic channel except that it is used for transmitting timing and other control information instead of telecommunications traffic. Furthermore, the control channels from different base stations are distinguishable from each other in that same manner that the traffic channels from different base stations are distinguishable from each other (ie., the control channels are distinguishable by frequency, time, or orthogonal code).

Because each base station 1103-j is capable of receiving n timing signals from n nearby base stations in n control channels, base station 1103-j directs each of wireless receivers 1204-1 through 1204-n to receive and demodulate one of the n incoming timing signals and to provide it to unanimity gate 1203-j. It will be clear to those skilled in the art how to make and use base station 1103-j so that it receives n timing signals from n other base stations.

At step 1324, the timing signal from phase-locked loop 1201-j is input to unanimity gate 1203-j with the n timing signals from n other base stations. The feedback signal from unanimity gate 1203-j is used in step 1321, as discussed above.

As the steps in FIG. 13 are performed at all of the base stations throughout the wireless telecommunications system, each base station's timing signal becomes synchronized, and will remain synchronized, to every other base station's timing signal.

Figure 11:
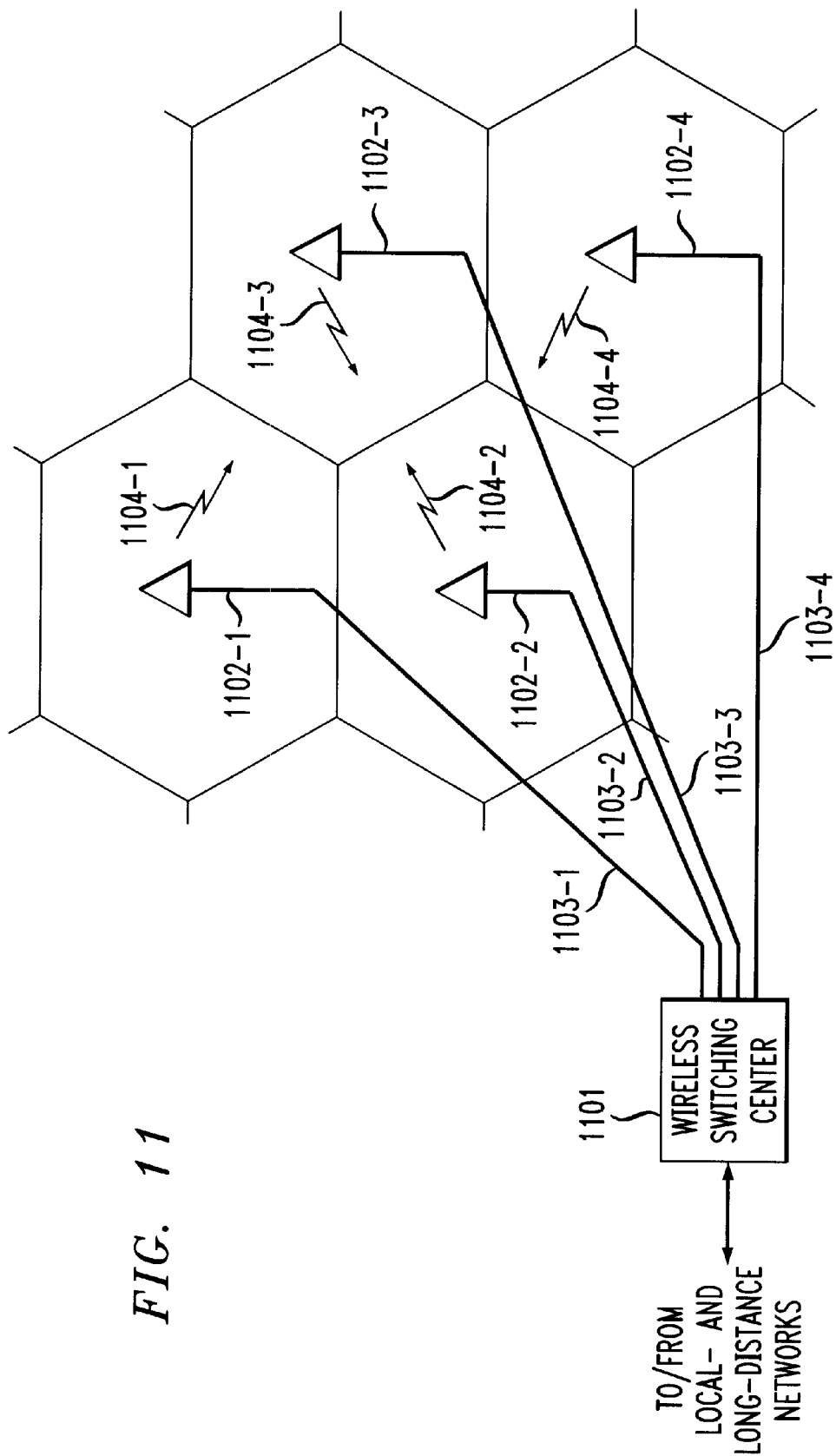
FIG. 11 depicts a schematic drawing of a portion of the illustrative embodiment of the present invention.

FIG. 14 depicts a series of timing signals associated with one base station that help in understanding the wireless telecommunications system in FIG. 11. Signal 1401 illustrates a reference timing signal as input to phase-locked loop 1201-i. Signal 1402 illustrates the timing signal output from phase-locked loop 1201-i, which is phase aligned with the leading edge of signal 1405, which is a feedback signal from unanimity gate 1203-i. Signals 1403 and 1404 represent timing signals received from other base stations and signal 1405 is a Boolean AND function of the output of phase-locked loop 1201-i and the timing signals received from the other base stations.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. A method comprising:
   transmitting a prior forward channel portion of a call to a wireless terminal in a forward channel from a first base station;
   detecting when said wireless terminal exits an area serviced by the first base station; and
   transmitting a later forward channel portion of said call to said wireless terminal in said forward channel from a second base station;
   wherein the transmission of said prior forward channel portion of said call ends concurrently with the beginning of transmission of said later forward channel portion of said call, and
   wherein the transmission of said prior forward channel portion of said call ends when it is detected that said wireless terminal exits said area serviced by the first base station.

2. The method of claim 1 wherein said first base station services a first cell, said second base station services a second cell, and the transmission of said prior forward channel portion of said call ends when said wireless terminal leaves said first cell.

3. The method of claim 1 wherein said forward channel is a time-division multiplexed channel and said prior forward channel portion and said later forward channel portion of said call occupy the same time-slot in said time-division multiplexed channel.

4. The method of claim 1 wherein said forward channel is a code-division multiplexed channel and said prior forward channel portion and said later forward channel portion of said call use the same code in said code-division multiplexed channel.

5. The method of claim 1 further comprising the steps of:
   receiving a prior reverse channel portion of said call from said wireless terminal in a reverse channel via said first base station; and
   receiving a later reverse channel portion of said call from said wireless terminal in said reverse channel via said second base station;
   wherein the reception of said prior reverse channel portion of said call ends concurrently with the beginning of reception of said later reverse channel portion of said call.

6. The method of claim 5 wherein the reception of said prior reverse channel portion of said call ends when said wireless terminal leaves said first cell.

7. The method of claim 5 wherein said reverse channel is a time-division multiple access channel and said prior forward channel portion and said later forward channel portion of said call occupy the same time-slot in said time-division multiple access channel.

8. The method of claim 5 wherein said reverse channel is a code-division multiple access channel and said prior forward channel portion and said later forward channel portion of said call use the same code in said code-division multiple access channel.

9. A wireless telecommunications system comprising:
   a first base station for transmitting a prior forward channel portion of a call to a wireless terminal in a forward channel from the first base station;
   a second base station for transmitting a later forward channel portion of said call to said wireless terminal in said forward channel from the second base station; and
   a detector for detecting when said wireless terminal exits an area serviced by the first base station;
   wherein the transmission of said prior forward channel portion of said call ends concurrently with the beginning of transmission of said later forward channel portion of said call, and
   wherein the transmission of said prior forward channel portion of said call ends when it is detected that said wireless terminal exits said area serviced by the first base station.

10. The wireless telecommunications system of claim 9 wherein said first base station services a first cell, said second base station services a second cell, and the transmission of said prior forward channel portion of said call ends when said wireless terminal leaves said first cell.

11. The wireless telecommunications system of claim 9 wherein said forward channel is a time-division multiplexed channel and said prior forward channel portion and said later forward channel portion of said call occupy the same time-slot in said time-division multiplexed channel.

12. The wireless telecommunications system of claim 9 wherein said forward channel is a code-division multiplexed channel and said prior forward channel portion and said later forward channel portion of said call use the same code in said code-division multiplexed channel.

13. The wireless telecommunications system of claim 9 further comprising:
a wireless switching center for receiving a prior reverse channel portion of said call from said wireless terminal in a reverse channel via said first base station; and receiving a later reverse channel portion of said call from said wireless terminal in said reverse channel via said second base station;
wherein the reception of said prior reverse channel portion of said call ends concurrently with the beginning of reception of said later reverse channel portion of said call.

14. The wireless telecommunications system of claim 13 wherein the reception of said prior reverse channel portion of said call ends when said wireless terminal leaves said first cell.

15. The wireless telecommunications system of claim 13 wherein said reverse channel is a time-division multiple access channel and said prior forward channel portion and said later forward channel portion of said call occupy the same time-slot in said time-division multiple access channel.

16. The wireless telecommunications system of claim 13 wherein said reverse channel is a code-division multiple access channel and said prior forward channel portion and said later forward channel portion of said call use the same code in said code-division multiple access channel.

17. A method comprising:
receiving a prior reverse channel portion of a call from a wireless terminal in a reverse channel via a first base station;
receiving a later reverse channel portion of said call from said wireless terminal in said reverse channel via a second base station; and
detecting when said wireless terminal exits an area serviced by the first base station;
wherein the reception of said prior reverse channel portion of said call ends concurrently with the beginning of reception of said later reverse channel portion of said call, and
wherein the transmission of said prior reverse channel portion of said call ends when it is detected that said wireless terminal exits said area serviced by the first base station.

18. The method of claim 17 wherein said first base station services a first cell, said second base station services a second cell, and the reception of said prior reverse channel portion of said call ends concurrently when said wireless terminal leaves said first cell.

19. The method of claim 17 wherein said reverse channel is a time-division multiple access channel and said prior forward channel portion and said later forward channel portion of said call occupy the same time-slot in said time-division multiple access channel.

20. The method of claim 17 wherein said reverse channel is a code-division multiple access channel and said prior forward channel portion and said later forward channel portion of said call use the same code in said code-division multiple access channel.

21. The method of claim 17 further comprising the steps of:
transmitting a prior forward channel portion of said call to said wireless terminal in a forward channel from said first base station; and
transmitting a later forward channel portion of said call to said wireless terminal in said forward channel from said second base station;
wherein the transmission of said prior forward channel portion of said call ends concurrently with the beginning of transmission of said later forward channel portion of said call.

22. The method of claim 21 wherein the transmission of said prior forward channel portion of said call ends when said wireless terminal leaves said first cell.

23. The method of claim 21 wherein said forward channel is a time-division multiplexed channel and said prior forward channel portion and said later forward channel portion of said call occupy the same time-slot in said time-division multiplexed channel.

24. The method of claim 21 wherein said forward channel is a code-division multiplexed channel and said prior forward channel portion and said later forward channel portion of said call use the same code in said code-division multiplexed channel.

25. A wireless telecommunications system comprising:
a wireless switching center for receiving a prior reverse channel portion of a call from a wireless terminal in a reverse channel via a first base station, and receiving a later reverse channel portion of said call from said wireless terminal in said reverse channel via a second base station; and
a detector for detecting when said wireless terminal exits an area serviced by the first base station;
wherein the reception of said prior reverse channel portion of said call ends concurrently with the beginning of reception of said later reverse channel portion of said call, and
wherein the transmission of said prior reverse channel portion of said call ends when it is detected that said wireless terminal exits said area serviced by the first base station.

26. The wireless telecommunications system of claim 25 wherein said first base station services a first cell, said second base station services a second cell, and wherein the reception of said prior reverse channel portion of said call ends when said wireless terminal leaves said first cell.

27. The wireless telecommunications system of claim 25 wherein said reverse channel is a time-division multiple access channel and said prior forward channel portion and said later forward channel portion of said call occupy the same time-slot in said time-division multiple access channel.

28. The wireless telecommunications system of claim 25 wherein said reverse channel is a code-division multiple access channel and said prior forward channel portion and said later forward channel portion of said call use the same code in said code-division multiple access channel.

29. The wireless telecommunications system of claim 25 wherein:
said first base station transmits a prior forward channel portion of said call to said wireless terminal in a forward channel from a first base station; and
said second base station transmits a later forward channel portion of said call to said wireless terminal in said forward channel from a second base station;

wherein the transmission of said prior forward channel portion of said call ends concurrently with the beginning of transmission of said later forward channel portion of said call.

30. The wireless switching center of claim 29 wherein the transmission of said prior forward channel portion of said call ends when said wireless terminal leaves said first cell.

31. The wireless switching center of claim 29 wherein said forward channel is a time-division multiplexed channel and said prior forward channel portion and said later forward channel portion of said call occupy the same time-slot in said time-division multiplexed channel.

32. The wireless switching center of claim 29 wherein said forward channel is a code-division multiplexed channel and said prior forward channel portion and said later forward channel portion of said call use the same code in said code-division multiplexed channel.

* * * * *